US010187606B2

(12) United States Patent
Ogi et al.

(10) Patent No.: US 10,187,606 B2
(45) Date of Patent: Jan. 22, 2019

(54) IMAGE PICKUP APPARATUS AND SYSTEM THAT MAY RESTRICT OR PERMIT IMAGE PICKUP OR STORAGE

(71) Applicant: Maxell, Ltd., Kyoto (JP)

(72) Inventors: Yuya Ogi, Tokyo (JP); Satoshi Ouchi, Tokyo (JP); Yoshiho Seo, Tokyo (JP); Toshiteru Nakamura, Tokyo (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 15/309,560

(22) PCT Filed: May 9, 2014

(86) PCT No.: PCT/JP2014/062506
§ 371 (c)(1),
(2) Date: Nov. 8, 2016

(87) PCT Pub. No.: WO2015/170409
PCT Pub. Date: Nov. 12, 2015

(65) Prior Publication Data
US 2017/0171498 A1 Jun. 15, 2017

(51) Int. Cl.
*H04N 5/77* (2006.01)
*H04N 5/225* (2006.01)
(Continued)

(52) U.S. Cl.
CPC .......... *H04N 5/907* (2013.01); *H04N 5/2256* (2013.01); *H04N 5/23206* (2013.01);
(Continued)

(58) Field of Classification Search
CPC .. H04N 5/2256; H04N 5/23293; H04N 5/772; H04N 5/907
See application file for complete search history.

(56) References Cited

U.S. PATENT DOCUMENTS 7,570,283 B2 * 8/2009 Sato ................... H04N 1/00281
348/211.2
8,417,000 B1 * 4/2013 Mendis ............. G06K 9/00671
382/118
(Continued)

FOREIGN PATENT DOCUMENTS

JP 2003-218992 A 7/2003
JP 2004-056769 A 2/2004
(Continued)

OTHER PUBLICATIONS

International Search Report of PCT/JP2014/062506 dated Jul. 29, 2014.

*Primary Examiner* — Amy R Hsu
(74) *Attorney, Agent, or Firm* — Mattingly & Malur, PC

(57) ABSTRACT

The objective of the invention is to enhance the convenience of image pickup apparatus, while protecting contents in an environment of viewing the contents. An image pickup apparatus is characterized in that the image pickup apparatus comprises: an image information acquisition unit that acquires image information generated by photoelectric conversion; an image storage processing unit that generates an image file on the basis of the acquired image information and that causes the image file to be stored on a storage medium; and a control unit that performs control to provide a state in which the acquisition of the image information is possible and the storage of the image file is restricted.

15 Claims, 12 Drawing Sheets

(51) Int. Cl.
*H04N 5/907* (2006.01)
*H04N 5/232* (2006.01)
*H04N 9/802* (2006.01)

(52) U.S. Cl.
CPC ......... *H04N 5/23293* (2013.01); *H04N 5/772* (2013.01); *H04N 9/802* (2013.01)

(56) References Cited

U.S. PATENT DOCUMENTS

| | | | |
|---|---|---|---|
| 9,160,904 B1* | 10/2015 | Chang | H04N 5/2251 |
| 2004/0202382 A1* | 10/2004 | Pilu | H04N 1/00167 |
| | | | 382/276 |
| 2005/0093980 A1* | 5/2005 | Nonaka | H04N 1/00127 |
| | | | 348/207.99 |
| 2005/0286879 A1* | 12/2005 | Nakaya | H04M 1/72577 |
| | | | 396/56 |
| 2006/0140475 A1* | 6/2006 | Chin | H04N 1/00323 |
| | | | 382/164 |
| 2011/0267492 A1* | 11/2011 | Prentice | G03B 7/08 |
| | | | 348/223.1 |

FOREIGN PATENT DOCUMENTS

| | | |
|---|---|---|
| JP | 2005-109956 A | 4/2005 |
| JP | 2005-136535 A | 5/2005 |
| JP | 2005-217977 A | 8/2005 |
| JP | 2005-328471 A | 11/2005 |
| JP | 2006-041841 A | 2/2006 |
| JP | 2007-116307 A | 5/2007 |
| JP | 2007-266882 A | 10/2007 |
| JP | 2008-294654 A | 12/2008 |
| JP | 2010-062778 A | 3/2010 |
| JP | 2010-147993 A | 7/2010 |
| JP | 2010-206587 A | 9/2010 |
| JP | 2011-244251 A | 12/2011 |
| JP | 2012-234086 A | 11/2012 |
| WO | 2005/094064 A1 | 10/2005 |

* cited by examiner

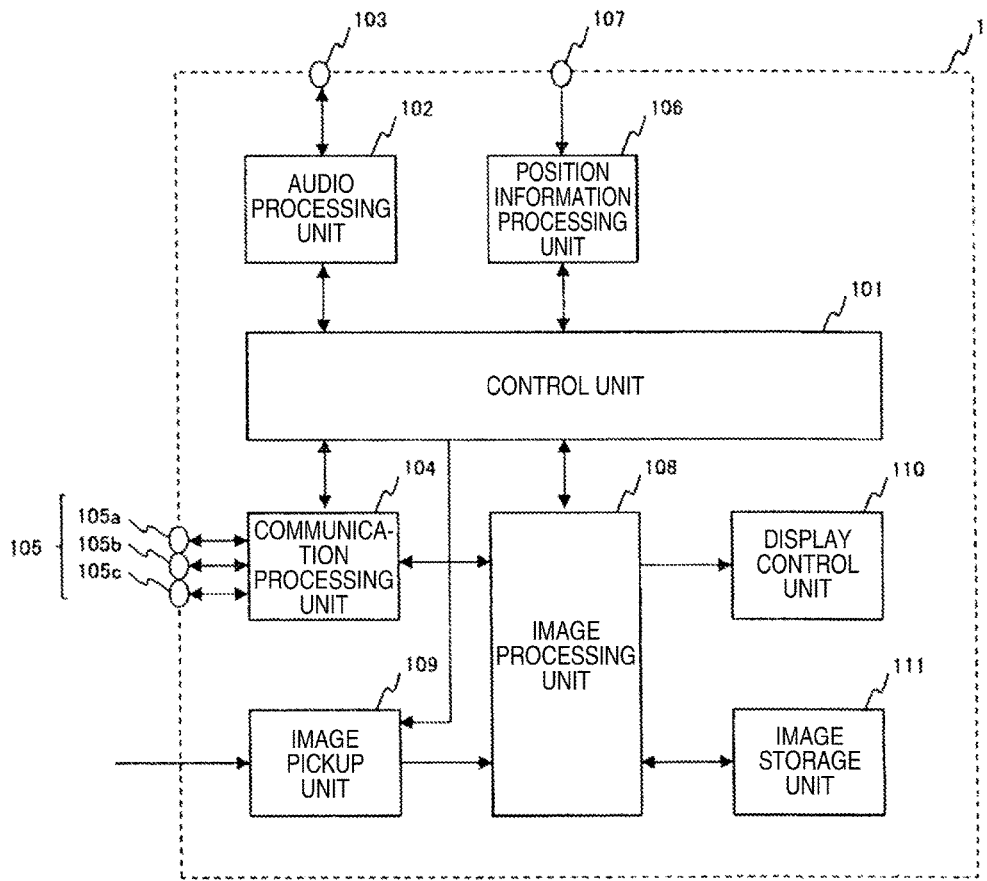

| POSITION INFORMATION | SIGNAL TYPE |
|---|---|
| (xx1, yy1) | CONTROL SIGNAL 2 |
| (xx2, yy2) | RELEASE SIGNAL |
| ... | ... |

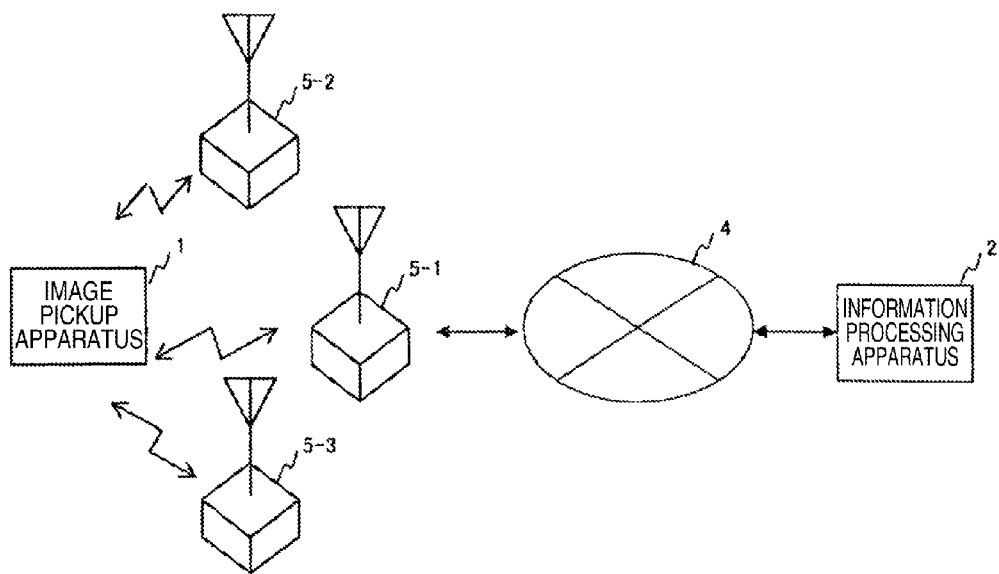

FIG.13
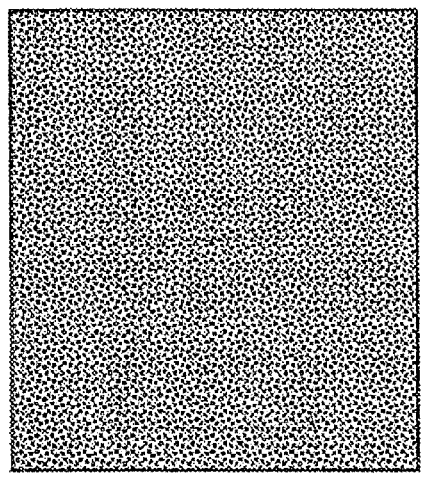
(a)
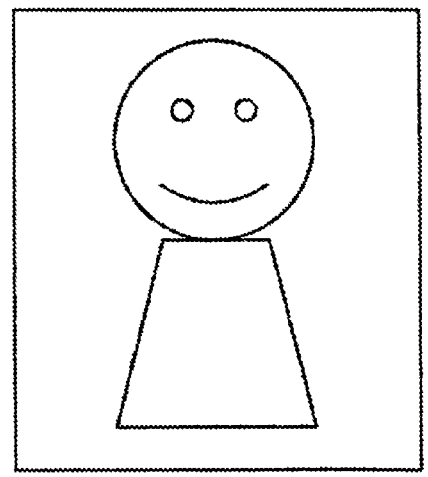
(b)

IMAGE PICKUP APPARATUS AND SYSTEM THAT MAY RESTRICT OR PERMIT IMAGE PICKUP OR STORAGE

TECHNICAL FIELD

The present invention relates to an image pickup apparatus and an image pickup system.

BACKGROUND ART

An example of the background art of the present technical field includes Patent Literature 1 (JP-A-2012-234086). This publication states "provided are: a reception unit that receives a signal transmitted by an external device, the signal prohibiting specific operation; and an image pickup unit that picks up a subject image, wherein the specific operation is prohibited according to the signal, and the specific operation is image pickup operation of the image pickup unit."

CITATION LIST

Patent Literature

Patent Literature 1: JP-A-2012-234086

SUMMARY OF INVENTION

Technical Problem

Content, such as videos played in movie theaters, live scenes in concert halls, and pictures displayed in museums, are protected by copyright and the like, and photographing of the content is often prohibited. In an environment of viewing the content for which photographing is prohibited, secret photographing of the content is considered a problem.

Patent Literature 1 proposes an image pickup apparatus intended to prevent secret photographing of content, wherein a transmission apparatus sends a radio wave with a predetermined prohibition signal into a predetermined photographing prohibited area, and the image pickup apparatus prohibits photographing when the image pickup apparatus receives the prohibition signal.

However, in the image pickup apparatus disclosed in Patent Literature 1, acquisition of image information from a camera module is completely prohibited in a photographing prohibited area. Therefore, information obtained by acquiring the image information is not obtained, and the convenience is low. For example, the image pickup apparatus disclosed in Patent Literature 1 cannot acquire image information of a subject, such as a picture, through a camera module in a museum or the like where photographing of content is prohibited, and augmented reality (AR) cannot be used to superimpose the information related to the subject on the subject.

The present invention has been made in view of the problem, and an object of the present invention is to enhance the convenience of an image pickup apparatus while protecting content in an environment of viewing the content.

Solution to Problem

To solve the problem, the present invention includes a control unit that performs control to provide a state in which acquisition of image information is possible and storage of the image file is restricted.

Advantageous Effects of Invention

According to the present invention, the convenience of an image pickup apparatus can be enhanced while protecting content in an environment of viewing the content. Other problems, configurations, and advantageous effects will become apparent from the following description of embodiments.

BRIEF DESCRIPTION OF DRAWINGS

FIG. 3 is a block diagram illustrating a functional configuration of the image pickup apparatus 1 according to the embodiment of the present invention;

FIG. 4 is a diagram illustrating types of restriction state of processes by an image pickup unit and an image processing unit according to the embodiment of the present invention;

FIG. 10 is a diagram illustrating an operation mode of the image pickup system in which the image pickup apparatus and the information processing apparatus are connected through a base station according to the embodiment of the present invention;

FIG. 11 is a diagram illustrating a MAC address list according to the embodiment of the present invention;

FIG. 13(a) is a diagram illustrating a photographic image picked up and generated by the image pickup unit according to the embodiment of the present invention, and FIG. 13(b) is a diagram illustrating a restored image in which the photographic image of FIG. 13(a) is restored;

DESCRIPTION OF EMBODIMENTS

Hereinafter, an embodiment of the present invention will be described in detail with reference to the drawings. Note that the following description is intended to describe an embodiment of the present invention and is not intended to limit the scope of the present invention. Therefore, those skilled in the art can adopt embodiments in which each or all of the elements are replaced by equivalent elements, and the embodiments are also included in the scope of the present invention.

First Example

Figure 1:
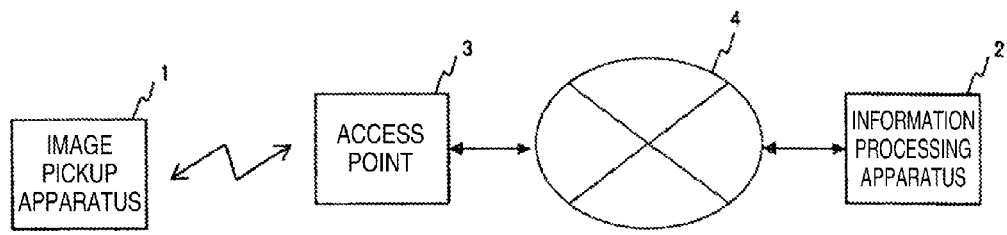
FIG. 1 is a diagram showing an example of an operation mode of an image pickup system according to an embodiment of the present invention.

Hereinafter, a first example will be described in detail with reference to the drawings. FIG. 1 is a diagram showing an example of an operation mode of an image pickup system according to the present embodiment. As shown in FIG. 1, an image pickup apparatus 1 and an information processing apparatus 2 are connected through a network 4, such as the Internet and a LAN (Local Area Network), in the image pickup system according to the present embodiment.

For example, when the image pickup apparatus 1 and the information processing apparatus 2 are connected by a wireless LAN, the image pickup apparatus 1 communicates with an access point 3 as shown in FIG. 1. The access point 3 is connected to the network 4 through a router not shown. As a result, the image pickup apparatus 1 and the information processing apparatus 2 are connected through the network 4 and transmit and receive information such as image signals.

The image pickup apparatus 1 has an image pickup function and generates a photographic image by picking up an image of an object to be taken that is a subject. The image pickup apparatus 1 is, for example, a wearable terminal, such as an HDM (Head Mounted Display) and a watch-type terminal, with a camera, a mobile terminal with a camera, or a digital camera.

The information processing apparatus 2 is an apparatus that processes the photographic image transmitted from the image pickup apparatus 1. For example, the information processing apparatus 2 generates display information for displaying information related to the subject included in the received photographic image on a display unit of the image pickup apparatus 1 based on augmented reality (AR) or applies a storage process to the received photographic images in a storage medium, an external server, or the like to accumulate the photographic images.

Figure 2:
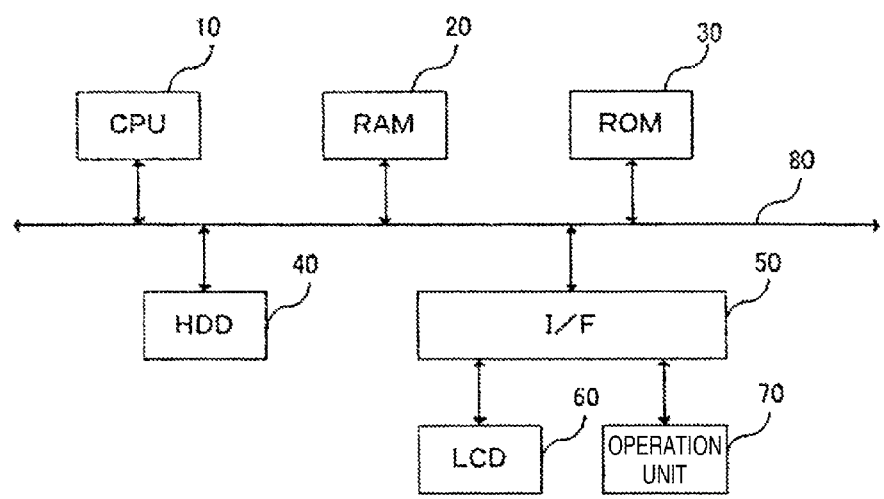
FIG. 2 is a block diagram illustrating a hardware configuration of an image pickup apparatus 1 according to the embodiment of the present invention.

Next, a hardware configuration of the image pickup apparatus 1 and the information processing apparatus 2 included in the image pickup system according to the present embodiment will be described. FIG. 2 is a block diagram illustrating a hardware configuration of the image pickup apparatus 1 according to the present embodiment. Although the hardware configuration of the image pickup apparatus 1 is illustrated in FIG. 2, the information processing apparatus 2 has a similar configuration. In addition to the hardware configuration shown in FIG. 2, the image pickup apparatus 1 includes an engine for realizing an image pickup function and the like.

As shown in FIG. 2, the image pickup apparatus 1 according to the present embodiment has a configuration similar to a general PC (Personal Computer), a server, and the like. More specifically, the image pickup apparatus 1 according to the present embodiment includes a CPU (Central Processing Unit) 10, a RAM (Random Access Memory) 20, a ROM (Read Only Memory) 30, a HDD (Hard Disk Drive) 40, and an I/F 50 which are connected through a bus 80. An LCD (Liquid Crystal Display) 60 and an operation unit 70 are connected to the I/F 50.

The CPU 10 is computation means and controls operation of the entire image pickup apparatus 1. The RAM 20 is a volatile storage medium capable of high-speed reading and writing of information and is used as a work area by the CPU 10 in processing the information. The ROM 30 is a read-only non-volatile storage medium and stores a program such as firmware. The HDD 40 is a non-volatile storage medium capable of reading and writing information and stores an OS (Operating System), various control programs, application programs, and the like.

The I/F 50 connects the bus 80 to various hardware, networks, and the like and controls them. The LCD 60 is a visual user interface for a user to check the state of the image pickup apparatus 1. The operation unit 70 is a user interface for the user to input information to the image pickup apparatus 1, such as a keyboard, a mouse, various hard buttons, and a touch panel. When the information processing apparatus 2 is operated as a server for image processing, the user interface devices may not be included.

With the hardware configuration, the CPU 10 performs computations according to the programs stored in the ROM 30 and the programs read out to the RAM 20 to configure a software control unit. A combination of the software control unit configured in this way and hardware forms a functional block for realizing functions of the image pickup apparatus 1 and the information processing apparatus 2 included in the image pickup system according to the present embodiment.

Next, functions of the image pickup apparatus 1 according to the present embodiment will be described. FIG. 3 is a block diagram illustrating a functional configuration of the image pickup apparatus 1 according to the present embodiment. As shown in FIG. 3, the image pickup apparatus 1 includes a control unit 101, an audio processing unit 102, an audio input-output unit 103, a communication processing unit 104, a communication input-output unit 105, a position information processing unit 106, a position information input unit 107, an image processing unit 108, an image pickup unit 109, a display control unit 110, and an image storage unit 111.

The communication input-output unit 105 includes 105a, 105b, and 105c. Although the communication input-output units 105a, 105b, and 105c use different communication systems in the description, the communication systems are not limited to the three types. The communication systems can be any of connection to a network through a wireless LAN or a communication base station of a mobile phone company, near-field wireless communication such as Bluetooth (registered trademark) and an IC (Integrated Circuit) tag, dedicated short range communication used in ETC (Electronic Toll Collection System), and the like.

Although the image pickup apparatus 1 directly connects to the network to exchange information in the description of the present embodiment, another information display terminal not shown may connect to the network. The information display terminal and the image pickup apparatus 1 may communicate, and the image pickup apparatus 1 may indirectly connect to the network.

The control unit 101 exchanges information with the image processing unit 108, the audio processing unit 102, the position information processing unit 106, and the communication processing unit 104 to acquire a restriction signal for performing control to restrict processes by the image processing unit 108 and the image pickup unit 109 and a release signal for releasing the restriction of the processes by the restriction signal and controls the image processing unit 108 and the image pickup unit 109 based on the acquired restriction signal and release signal. Details of the restriction signal and the release signal will be described later.

The audio processing unit 102 acquires audio information input from the audio input-output unit 103, such as a microphone and an earphone. When the acquired audio information is a restriction signal or a release signal, the audio processing unit 102 outputs the restriction signal or the release signal to the control unit 101. Details of the acquisition of the restriction signal or the release signal by the audio processing unit 102 will be described later.

The communication processing unit 104 exchanges information with other apparatuses, such as the information processing apparatus 2 connected through the network, through the communication input-output unit 105 and exchanges information with the configurations units of the image pickup apparatus 1. When the acquired information is a restriction signal or a release signal, the communication processing unit 104 outputs the restriction signal or the release signal to the control unit 101. Details of the acquisition of the restriction signal or the release signal by the communication processing unit 104 will be described later.

The position information processing unit 106 acquires position information input from the position information input unit 107 such as a GPS (Global Positioning System). When a restriction signal or a release signal is acquired based on the acquired position information, the position information processing unit 106 outputs the restriction signal or the release signal to the control unit 101. Details of the acquisition of the restriction signal or the release signal by the position information processing unit 106 will be described later.

The image pickup unit 109 is an image information acquisition unit that acquires, as image information, an image signal of a subject according to the control by the control unit 101. Specifically, the image pickup unit 109 converts an image of a subject to an electrical signal by photoelectric conversion to generate and acquire an image signal and outputs the image signal to the image processing unit 108. Hereinafter, the process of acquiring the image signal generated by the photoelectric conversion by the image pickup unit 109 will be referred to as an "image pickup process" in the present embodiment. Photographic image information that is the image signal generated by the photoelectric conversion will be referred to as a "photographic image".

When the control unit 101 controls the image pickup unit 109 based on the restriction signal, the image pickup process is prohibited. For example, the control unit 101 stops transmitting an image pickup command signal to the image pickup unit 109, and the image pickup unit 109 stops executing the image pickup process. When the control unit 101 controls the image pickup unit 109 based on the release signal, the image pickup unit 109 releases the restriction state of the image pickup process.

The image processing unit 108 determines whether the photographic image output from the image pickup unit 109 includes a restriction signal. If the photographic image includes a restriction signal, the image processing unit 108 outputs the restriction signal to the control unit 101. Details of a mode in which the photographic image includes the restriction signal will be described later. If the photographic image includes a restriction signal, the image processing unit 108 processes the acquired photographic image based on the restriction signal.

The image processing unit 108 generates an image file in a data format managed by a file system based on the acquired photographic image and stores the image file in the image storage unit 111 that is a storage medium, for example. Note that in the present embodiment, the process by the image processing unit 108 generating an image file based on the photographic image and storing the image file in the storage medium will be referred to as an "image storage process". Therefore, the image processing unit 108 functions as an image storage processing unit.

The image information acquired in the image pickup process by the image pickup unit 109 described above is data temporarily stored in the RAM 20 or the like to generate information for performing AR display, for example. On the other hand, the image file stored in the storage medium in the image storage process by the image processing unit 108 is data that can be browsed as a file stored in the HDD 40 or the like. In the present embodiment, the process of acquiring the image information (image pickup process) and the process of generating the image file from the image information and storing the image file in the storage medium (image storage process) are distinguished, and the processes are restricted according to the restriction signal. This is the point of the present embodiment. Details of the processing of the photographic image by the image processing unit 108 based on the restriction signal will be described later.

When the image processing unit 108 generates the image file from the image information, the image processing unit 108 may directly put the image information in the format of the file system to generate the image file or may generate the image file after applying a certain process, such as a compression process, to the image information. In the following description, the image file stored in the image storage unit 111 by the image storage process will also be written as a "photographic image". Therefore, the fact that the image processing unit 108 stores the photographic image in the image storage unit 111 means that the photographic image is stored in the image storage unit 111 in the format of the image file.

When the control unit 101 controls the image processing unit 108 based on the restriction signal, the image processing unit 108 processes the photographic image according to the control. The processing of the photographic image according to the control by the control unit 101 is similar to the processing of the photographic image based on the restriction signal included in the photographic image, and details will be described later.

The image processing unit 108 acquires image information from the communication processing unit 104 and the image storage unit 111 and executes a process according to the acquired image information. For example, when the image information is display information for displaying the information related to the subject acquired by the image pickup unit 109, the image processing unit 108 generates a display image based on the display information and outputs the display image to the display control unit 110.

When additional information is added to the acquired photographic image for example, the image processing unit 108 transmits the photographic image to another apparatus through the communication processing unit 104, outputs the photographic image to the display control unit 110, or stores the photographic image in the image storage unit 111, according to the additional information. Details of the process according to the additional information will be described later.

The display control unit 110 acquires the image information input from the image processing unit 108 and displays the acquired image information on a display unit such as the LCD 60. The image storage unit 111 is a storage medium that stores the photographic image input from the image processing unit 108. Although the image storage unit 111 is included in the image pickup apparatus 1 in the example described in the present embodiment, this is just an example. The image pickup apparatus 1 may include an interface for storage medium, and the photographic image may be stored in an external storage medium such as an SD card.

Next, details of the restriction signal acquired by the control unit 101 from the audio processing unit 102, the communication processing unit 104, the position information processing unit 106, and the image processing unit 108 will be described. FIG. 4 is a diagram illustrating types of the restriction state of the processes by the image pickup unit 109 and the image processing unit 108. As shown in FIG. 4, the restriction states of the image pickup process by the image pickup unit 109 and the image storage process by the image processing unit 108 are determined in advance according to values of the restriction signal, and the restriction states are stored in a storage medium or the like not shown in a state that the control unit 101 can reference.

As shown in FIG. 4, when the restriction signal is not acquired ("-") or "0", this is a state in which the image pickup process by the image pickup unit 109 and the image storage process are possible, and the state will be referred to as a "normal operation state". When the restriction signal is "1", although the image pickup process and the image storage process are possible, this is a state in which a specific command is added to the photographic image to be stored, and the photographic image is stored in the image storage unit 111 in the image storage process. The state will be referred to as a "specific operation state 1".

The specific command is information indicating restriction of the process for the photographic image and is, for example, a command for prohibiting transmission of the photographic image stored in the image storage unit 111 to another apparatus connected to the network through the communication processing unit 104 or a command for allowing only the user possessing the image pickup apparatus 1 to browse the photographic image. Other examples of the specific command include a request that requires personal authentication (for example, user ID and password) to browse the photographic image although the photographic image can be transmitted to another apparatus connected to the network through the communication processing unit 104 and a command for blocking disclosure on the Internet from another apparatus receiving the signal. Therefore, the photographic image provided with the specific command is stored in the image storage unit 111 for personal use only. The specific command also includes information of the restriction signal acquired by the control unit 101 from the audio processing unit 102 or the like.

In this way, the photographic image with the specific command added as the addition information is stored in the image storage unit 111, and this can protect the content by preventing outflow and the like of the content stored as the photographic image. Note that the method of adding the specific command can be any method, such as adding the specific command to a header of the photographic image, as long as the specific command and the photographic image are paired.

When the restriction signal is "2", this is a state in which the image pickup process is possible, but the image storage process is not possible. The state will be referred to as a "specific operation state 2". When the restriction signal is "3", this is a state in which the image pickup process and the image storage process are not possible. The state will be referred to as a "specific operation state 3". The control unit 101 specifies the state of the acquired restriction signal from among the operation states shown in FIG. 4 and controls the operation state so that the image pickup unit 109 and the image processing unit 108 operate according to the specified state. Therefore, the restriction signal is restriction information indicating a combination of presence/absence of the restrictions of the image pickup process and the image storage process, and the control unit 101 functions as a restriction information acquisition unit that acquires the restriction information.

Figure 5:
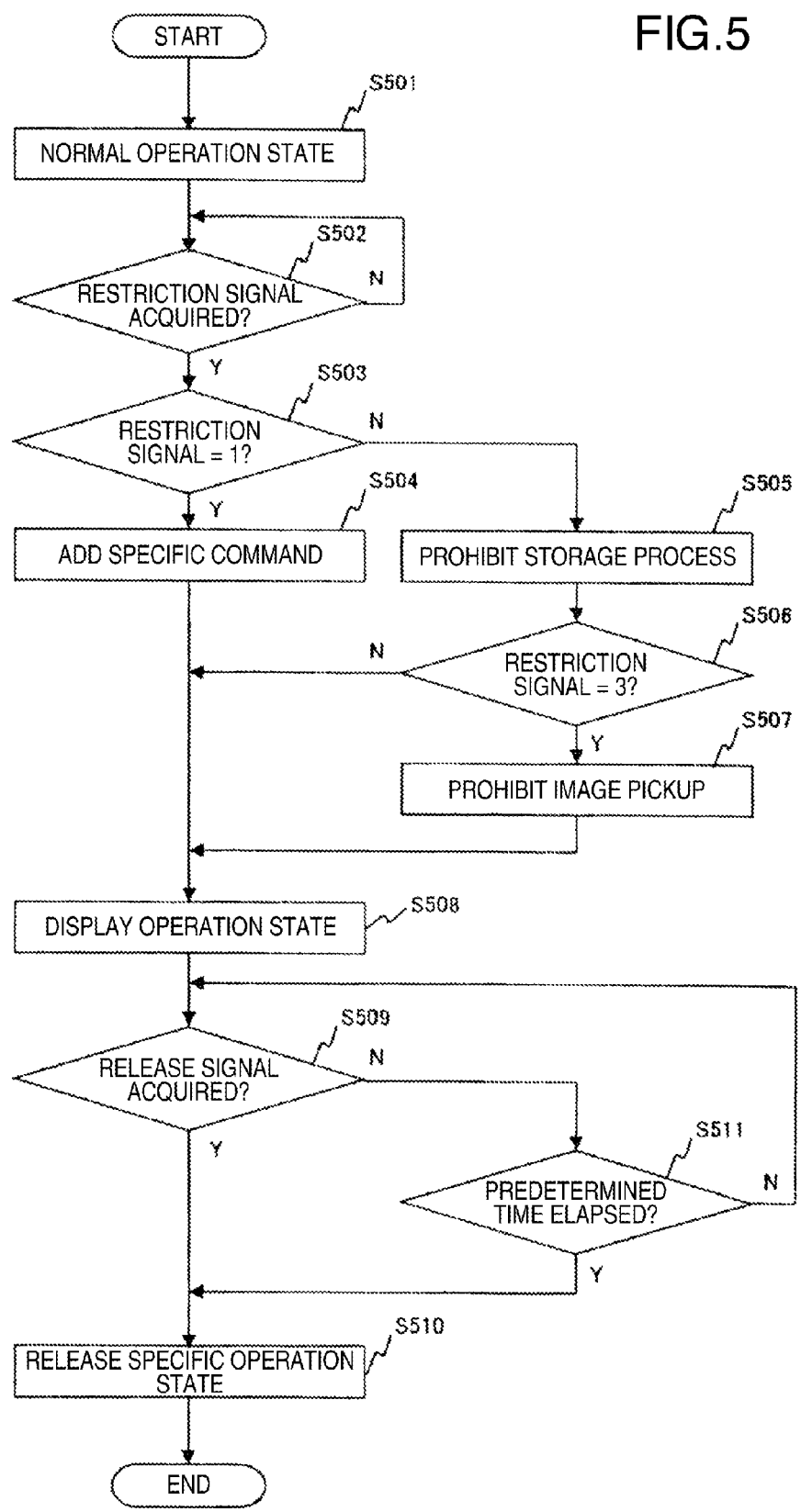
FIG. 5 is a flow chart illustrating control operation by a control unit based on a restriction signal according to the embodiment of the present invention.

In this way, controlling the operation states of the image pickup process by the image pickup unit 109 and the image storage process by the image processing unit 108 according to, for example, the type of the restriction signal is the point in the embodiment according to the present invention. Next, a process by the control unit 101 that performs the control will be described. FIG. 5 is a flow chart illustrating control operation by the control unit 101 based on the restriction signal.

As shown in FIG. 5, in an initial state such as when power is input to the image pickup apparatus 1, the control unit 101 provides the "normal operation state" shown in FIG. 4 to control the image pickup unit 109 and the image processing unit 108 (S501). The control unit 101 that has provided the "normal operation state" to control the image pickup unit 109 and the image processing unit 108 waits (S502/NO) until the image processing unit 108 acquires the restriction signal from the audio processing unit 102 or the like (S502/YES).

If the control unit 101 acquires the restriction signal (S502/YES), the control unit 101 determines whether the acquired restriction signal is "1" (S503). If the acquired restriction signal is "1" (S503/YES), the control unit 101 provides the "specific operation state 1" shown in FIG. 4 to control the image processing unit 108 and provides the restriction state in which the acquired photographic image is stored in the image storage unit 111 after the specific command is added (S504).

On the other hand, if the acquired restriction signal is not "1" (S503/NO), the control unit 101 controls the image processing unit 108 to prohibit the storage of the acquired photographic image in the image storage unit 111 (S505). This is because when the restriction signal is not "1", the specific operation state is the "specific operation state 2" or the "specific operation state 3", and the storage of the acquired photographic image in the image storage unit 111 is prohibited.

If the acquired restriction signal is "3" (S506/YES), the control unit 101 that has performed the control of prohibiting the storage of the photographic image in the image storage unit 111 provides the "specific operation state 3" shown in FIG. 4 to control the image pickup unit 109 and provides the state in which the execution of the image pickup process is not possible (S507).

On the other hand, if the acquired restriction signal is "2" (S506/NO), the control unit 101 provides the "specific operation state 2" shown in FIG. 4 and controls the image pickup unit 109 to provide the state in which the execution of the image pickup process is possible. More specifically, for example, the user can use the image pickup apparatus 1 in a museum, and the image pickup unit 109 can pick up an image of a picture that is the subject and display information related to the imaged picture on the display unit or the like of the image pickup apparatus 1 based on the AR. However, the photographic image of the imaged picture cannot be stored in the image storage unit 111.

The control unit 101 that has performed the control of restricting the processing operation of the image pickup unit 109 and the image processing unit 108 according to the acquired restriction signal notifies the image processing unit 108 to generate operation state display images for displaying the operation state indicated by the acquired restriction signal (S508).

Figure 6:
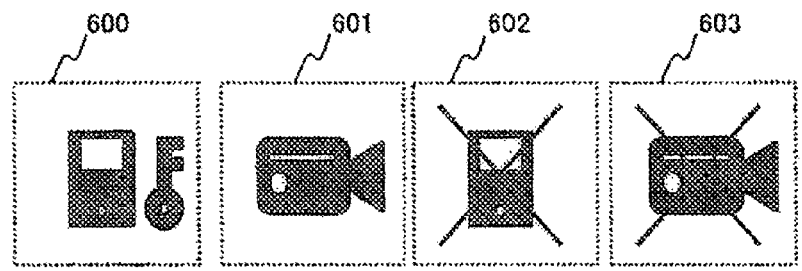
FIG. 6 is a diagram illustrating operation state display images according to the embodiment of the present invention.

FIG. 6 is a diagram illustrating the operation state display images. As shown in FIG. 6, examples of the operation state display images include: an icon 600 in a shape of a floppy disk with a key mark indicating that the specific command is added in the storage process of the photographic image; an image pickup icon 601 indicating the state that the image pickup process by the image pickup unit 109 is possible; a storage prohibition icon 602 in which the storage process of the photographic image is in the prohibition state; and an image pickup prohibition icon 603 in which the image pickup process by the image pickup unit 109 is in the prohibition state.

Figure 7:
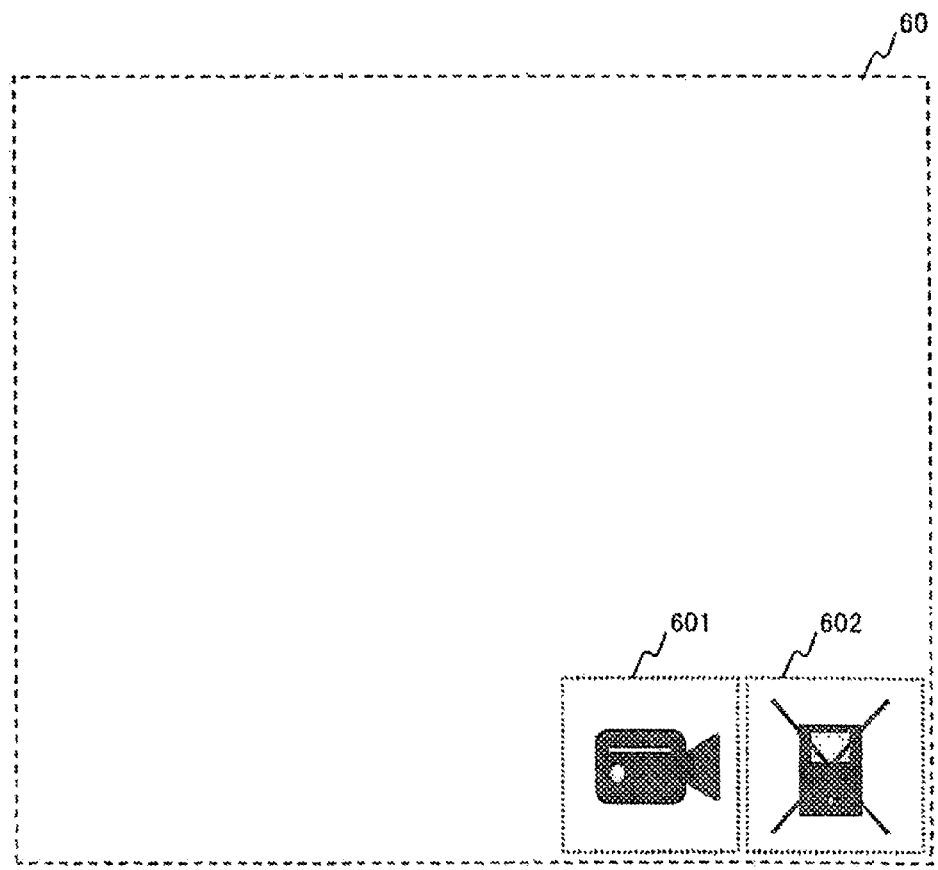
FIG. 7 is a diagram illustrating a display screen displayed on a display unit of the image pickup apparatus according to an operation state according to the embodiment of the present invention.

FIG. 7 is a diagram illustrating a display screen displayed on the display unit of the image pickup apparatus 1 according to the operation state. The image processing unit 108 generates the icons of the operation state display images shown in FIG. 6 according to the operation state indicated by the restriction signal acquired by the control unit 101 and displays the icons on the LCD 60 or the like through the display control unit 110. For example, the image pickup icon 601 and the storage prohibition icon 602 are displayed on the display screen shown in FIG. 7, and the operation state is the "specific operation state 2".

In addition, the icon 600 with the key mark and the image pickup icon 601 are displayed when the operation state is the "specific operation state 1". The storage prohibition icon 602 and the image pickup prohibition icon 603 are displayed when the operation state is the "specific operation state 3".

If the control unit 101 acquires a release signal from the audio processing unit 102 or the like (S509/YES), the control unit 101 releases the specific operation state provided by the acquired restriction signal (S510) and ends the process. The release signal is a signal for releasing the specific operation state, and the release signal is input from the audio processing unit 102 or the like and is different from the restriction signal. Alternatively, the release signal may also be a restriction signal in which the value is "0".

On the other hand, if the control unit 101 does not acquire the release signal (S510/NO) and the time after the shift from the normal operation state to the specific operation state has not become more than a predetermined time (for example, two hours) (S511/NO), the control unit 101 maintains the specific operation state. On the other hand, if the time after the shift from the normal operation state to the specific operation state has become more than the predetermined time (S511/YES) even if the control unit 101 does not acquire the release signal (S510/NO), the control unit 101 releases the specific operation state provided by the acquired restriction signal (S510).

Although the predetermined time may be a fixed time, time information may be added to the restriction signal acquired by the control unit 101. In this way, the control unit 101 can set the time for maintaining the specific operation state based on the added time information. Therefore, the control unit 101 can maintain the specific operation state according to, for example, the play time of a movie in a movie theater. In the example described in the present embodiment, the specific operation state is released if the time after the shift from the normal operation state to the specific operation state has become more than the predetermined time. Alternatively, the specific operation state may be released if the image pickup apparatus 1 is at a position more than a predetermined distance away from a position where the image pickup apparatus 1 has shifted to the specific operation state.

Next, details of the acquisition process of the restriction signal and the release signal by each of the audio processing unit 102, the image processing unit 108, the communication processing unit 104, and the position information processing unit 106 will be described.

The audio processing unit 102 analyzes audio information input from the audio input-output unit 103. More specifically, when high-frequency audio hard for human ears to hear is input, the audio processing unit 102 acquires the audio information as a restriction signal and a release signal. Since the frequency of the sound that the humans can hear is about 20 Hz to 20 kHz, sound with a frequency near 20 kHz is input as a restriction signal or a release signal, for example. The plurality of specific operation states can be handled by changing the frequency of the input sound or by providing a change by temporally repeating a generation period of the sound, that is, ON/OFF of the input sound, while maintaining the frequency of the input sound.

An apparatus that generates the audio can be installed at an entrance gate in an environment of viewing the content protected by copyright or the like, and the image pickup apparatus 1 can be contactlessly shifted to the specific operation state. An apparatus that generates audio corresponding to the release signal can be installed at an exit gate, and the image pickup apparatus 1 can be contactlessly shifted from the specific operation state to the normal operation state.

The image processing unit 108 analyzes the photographic image acquired from the image pickup unit 109. More specifically, when a specific image object is detected from the taken photographic image, the specific image object is acquired as a restriction signal. Examples of the specific image object include two-dimensional information like a QR code (registered trademark) (Quick Response Code) indicating image pickup prohibition, a mark of image pickup prohibition, and a character of image pickup prohibition. Particularly, when video information is presented as in a movie theater, an image for image pickup prohibition can be inserted every several frames in the video content, and the image pickup apparatus 1 can be shifted to the specific operation state to prevent secret photographing. Note that an image pickup frequency of the image pickup unit and a frame frequency of the video content are generally different, and the image for image pickup prohibition in the video content needs to be inserted for a plurality of times. However, human eyes can hardly perceive the image, and secret photographing can be prevented without a problem.

The specific image object may include a storage process prohibition mark or a storage process prohibition character of the photographic image. The image processing unit 108 acquires the restriction signal according to the combination of the objects from the photographic image. Alternatively, the specific image object may be an electronic watermark. When the electronic watermark is included in the photographic image, the photographic image is not different from the original data at a glance. However, when the image processing unit 108 executes a detection process of the electronic watermark to detect the electronic watermark, the image processing unit 108 acquires information of the detected electronic watermark as a restriction signal.

When the detected specific object is, for example, two-dimensional information like a QR code indicating image pickup permission, an image pickup permission mark, a character of image pickup permission, a storage process permission mark, or a character of permission of storage process, the image processing unit 108 acquires the detected specific object as a release signal.

The communication processing unit 104 passively or actively acquires the restriction signal and the release signal. An example of using an IC tag will be described as a passively operating communication system. When the IC tag is used, the restriction signal and the release signal can be contactlessly transmitted to the image pickup apparatus 1. More specifically, the passively operating communication system is a system using electromagnetic induction enacted in ISO/IEC 18000-3 or a system using a UHF band enacted in SO/IEC 18000-3.

An apparatus that transmits and receives the IC tag and the data can be installed at an entrance gate in an environment of viewing the content protected by copyright or the like, and the image pickup apparatus 1 can be contactlessly shifted to the specific operation state. An apparatus that transmits and receives the IC tag and the data can be installed at an exit gate, and the image pickup apparatus 1 can also be contactlessly shifted from the specific operation state to the normal operation state. Although the communication using the IC tag is described in the present embodiment, this is just an example. The communication system may be any communication system in which the image pickup apparatus 1 passively operates.

An acquisition process using a wireless LAN will be described as an example of an actively operating communication system. When the wireless LAN is used, the communication processing unit 104 can acquire a beacon signal transmitted from the access point 3, and another apparatus can check an ESSID or a modulation system of the access point. In the case of the network configuration as in FIG. 1, the image pickup apparatus 1 actively acquires the beacon signal transmitted from the access point 3, and after mutually checking the ESSID or the modulation system, the image pickup apparatus 1 connects to the network 4 through authentication, association, and exchange of data. Here, the restriction signal and the release signal can be multiplexed in the beacon signal, and the image pickup apparatus 1 can actively acquire the restriction signal and the release signal.

Figures 8, 9:
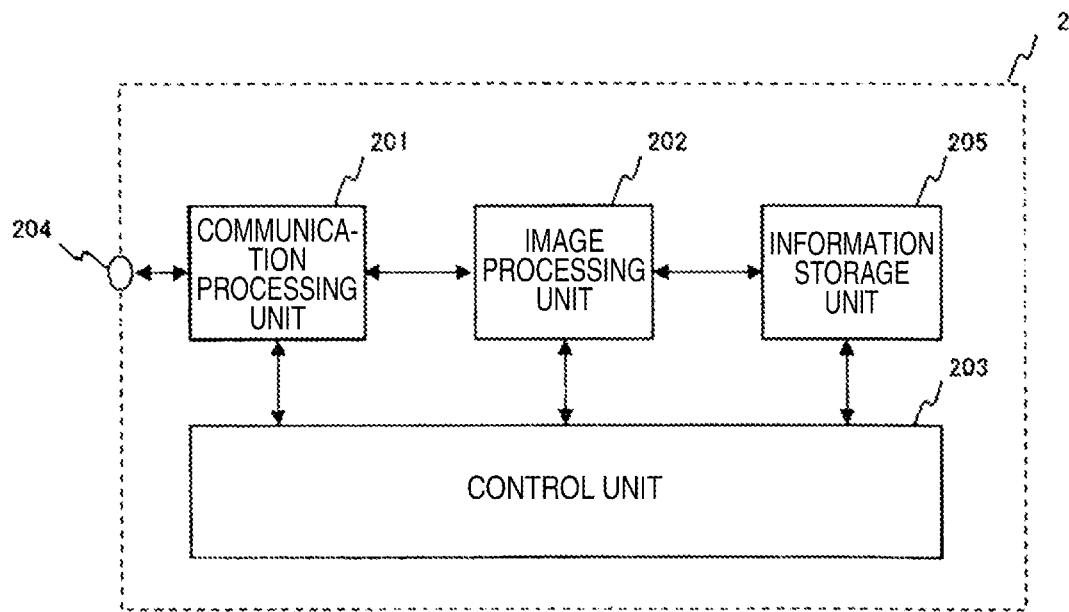
FIG. 8 is a block diagram illustrating a functional configuration of an information processing apparatus according to the embodiment of the present invention.
FIG. 9 is a diagram illustrating a position information list according to the embodiment of the present invention.

The position information processing unit 106 acquires the restriction signal and the release signal through the information processing apparatus 2. FIG. 8 is a block diagram illustrating a functional configuration of the information processing apparatus 2 according to the present embodiment. As shown in FIG. 8, the information processing apparatus 2 includes a communication processing unit 201, an image processing unit 202, a control unit 203, a communication input-output unit 204, and an information storage unit 205.

The position information processing unit 106 outputs the acquired position information to the communication processing unit 104 through the control unit 101. The communication processing unit 104 transmits the position information to the information processing apparatus 2 through the communication input-output unit 105. The communication processing unit 201 of the information processing apparatus 2 acquires the position information transmitted from the image pickup apparatus 1 through the communication input-output unit 204 and outputs the position information to the control unit 203.

The control unit 203 refers to the acquired position information and a position information list stored in the information storage unit 205 and determines whether to transmit the restriction signal or the release signal to the image pickup apparatus 1. FIG. 9 is a diagram illustrating the position information list. As shown in FIG. 9, the position information (for example, longitude and latitude) and the type of the signal are associated in the position information list. When there is a signal type coinciding with the acquired position information in the position information list shown in FIG. 9, the control unit 203 transmits the signal of the signal type to the image pickup apparatus 1. When the restriction signal or the release signal is transmitted from the information processing apparatus 2, the position information processing unit 106 acquires the transmitted restriction signal or the release signal and outputs the restriction signal or the release signal to the control unit 101.

In this way, the control unit 101 acquires the restriction information based on the input information input according to the location of the image pickup process, such as audio information, a photographic image, a wireless signal of an IC tag or a beacon, and position information.

As described, the image pickup apparatus 1 according to the present embodiment performs the control to provide the state in which the acquisition of the photographic image by the image pickup unit 109 is possible, and the storage process of the image file generated based on the photographic image by the image processing unit 108 is restricted. Therefore, according to the image pickup apparatus 1 of the present embodiment, the image information of the content can be acquired through the image pickup unit 109 in the environment of viewing the content for which the photographing is prohibited, and the information related to the content can be acquired based on the image information. However, an image file of the acquired image information cannot be generated and saved, and the content cannot be browsed or distributed later. As a result, in the environment of viewing the content, the convenience of the image pickup apparatus can be enhanced while protecting the content.

In the example described in the present embodiment, the initial state of the image pickup apparatus 1 is the "normal operation state", and one of the "specific operation state 1", the "specific operation state 2", and the "specific operation state 3" is provided based on the acquired restriction signal as shown in FIG. 5. Alternatively, the initial state of the image pickup apparatus 1 may be the "specific operation state 3" that is a state in which the image pickup process by the image pickup unit 109 and the image storage process by the image processing unit 108 are not possible, and one of the "normal operation state", the "specific operation state 1", and the "specific operation state 2" may be provided based on the acquired restriction signal or release signal.

In this case, when the audio processing unit 102 acquires the restriction signal or the release signal for example, the audio generation apparatus installed at the entrance gate generates audio information acquired as a restriction signal for providing the "specific operation state 1" or the "specific operation state 2" or a release signal for providing the "normal operation state". The audio generation apparatus installed at the exit gate generates audio information acquired as a restriction signal for providing the "specific operation state 3". Note that when the environment for viewing the content is the "specific operation state 3", a gate or the like for acquiring the restriction signal and the release signal does not have to be prepared.

More specifically, in this case, the restriction is reduced or released from the strictest state of the restriction for the image pickup unit 109 and the image processing unit 108 according to the environment for viewing the content. For example, when the user needs to launch a dedicated application installed on the image pickup apparatus 1 to acquire a restriction signal from the audio processing unit 102 or the like, the image pickup process and the image storage process cannot be set to the restriction state unless the user launches the application, if the initial state is the "normal operation state". Therefore, the user who intends to secretly photograph the content may not launch the application. On the other hand, if the initial state is the "specific operation state 3", the strictest restriction state is provided when the user does not launch the application, and the secret photographing of the content can be more easily prevented.

In the example described in the present embodiment, the position information processing unit 106 uses the position information input from the position information input unit 107 such as a GPS. Alternatively, the position information may be a MAC (Media Access Control) address of the access point 3 around the image pickup apparatus 1. In a device provided with a wireless LAN, MAC address information of a surrounding wireless LAN device or the strength information of a radio wave can be acquired without performing the authentication. Therefore, the information processing apparatus 2 can use the MAC address of the access point 3 around the image pickup apparatus 1 as the position information.

Although the image pickup apparatus 1 actively transmits the position information to the information processing apparatus 2 in the example described in the present embodiment, this is just an example. FIG. 10 is a diagram illustrating an operation mode of the image pickup system in which the image pickup apparatus 1 and the information processing apparatus 2 are connected through a base station. For example, when the data is transmitted and received to and from the information processing apparatus 2 through a base station 5-1 shown in FIG. 10, the base station 5-1 may add the position information to the data from the image pickup apparatus 1. In this way, the information processing apparatus 2 can acquire the position information of the image pickup apparatus 1 even when the GPS function of the image pickup apparatus 1 is invalidated or even in a room or underground where a GPS signal cannot be received, and the restriction signal and the release signal can be appropriately transmitted to the image pickup apparatus 1. Note that the base station 5-1 acquires the position information based on communication strength with other base stations 5-2 and 5-3.

In addition, when the image pickup apparatus 1 transmits and receives the data to and from the information processing apparatus 2 through the access point 3, the control unit 203 refers to the MAC address of the access point 3 and a MAC address list stored in the information storage unit 205 to determine whether to transmit the restriction signal or the release signal to the image pickup apparatus 1. FIG. 11 is a diagram illustrating the MAC address list. As shown in FIG. 11, the MAC address and the type of the signal are associated in the MAC address list.

When there is a signal type coinciding with the MAC address of the access point 3 in the MAC address list shown in FIG. 11, the control unit 203 transmits the signal of the signal type to the image pickup apparatus 1. When the restriction signal or the release signal is transmitted from the information processing apparatus 2, the position information processing unit 106 acquires the transmitted restriction signal or release signal and outputs the restriction signal or the release signal to the control unit 101. In this way, the information processing apparatus 2 can appropriately transmit the restriction signal and the release signal to the image pickup apparatus 1 that uses a specific communication network.

In the example described in the present embodiment, the image processing unit 108 of the image pickup apparatus 1 determines whether the restriction signal or the release signal is included in the photographic image. Alternatively, the information processing apparatus 2 may execute the process by the image processing unit 108.

In this case, the image pickup apparatus 1 transmits the photographic image acquired by the image pickup unit 109 to the information processing apparatus 2 through the network. When the photographic image is transmitted from the image pickup apparatus 1, the communication processing unit 201 of the information processing apparatus 2 shown in FIG. 8 acquires the transmitted photographic image and outputs the photographic image to the image processing unit 202.

The image processing unit 202 extracts feature information from the photographic image output from the communication processing unit 201 and transmits the feature information to the control unit 203. The control unit 203 compares the feature information acquired from the image processing unit 202 and feature information of the specific image object stored in the information storage unit 205 to determine whether to transmit the restriction signal and the release signal to the image pickup apparatus 1. For example, the specific image object is two-dimensional information like a QR code, a mark of image pickup prohibition, a character of image pickup prohibition, or a picture stored in the information storage unit 205 and protected by the copyright. The feature information of the picture is obtained by quantifying features, such as size, hue, composition, and display mode. In this way, a use method can be realized, in which an image of a picture is taken to specify the picture, and the information related to the picture is presented to the user based on the AR, while the copyright of the picture is protected.

The specific image object may include a storage process prohibition mark or a storage process prohibition character of the photographic image. The image processing unit 202 acquires the restriction signal according to the combination of the objects from the photographic image. Alternatively, the specific image object may be an electronic watermark. When the electronic watermark is included in the photographic image, the photographic image is not different from the original data at a glance. However, when the image processing unit 202 executes a detection process of the electronic watermark to detect the electronic watermark, the image processing unit 202 acquires information of the detected electronic watermark as a restriction signal.

When the detected specific object is, for example, two-dimensional information like a QR code indicating image pickup permission, an image pickup permission mark, a character of image pickup permission, a storage process permission mark, or a character of permission of storage process, the image processing unit 202 acquires the detected specific object as a release signal.

According to the process, the image pickup apparatus 1 side does not have to execute the process of determining whether the restriction signal or the release signal is included in the photographic image. Therefore, the circuit dimension of the image pickup apparatus 1 can be reduced, and the memory capacity necessary for the process can be reduced.

In the example described in the present embodiment, the configuration units that acquire the restriction signal and the release signal include the audio processing unit 102, the communication processing unit 104, the position information processing unit 106, and the image processing unit 108. However, not all of the configuration units must execute the process of acquiring the restriction signal and the release signal. As long as one of the configuration units can execute the process of acquiring the restriction signal and the release signal, the other configurations unit may not execute the process.

In the example described in the present embodiment, the image processing unit 108 stores the photographic image in the image storage unit 111 included in the image pickup apparatus 1 according to the operation state based on the restriction signal or the release signal. Alternatively, the image processing unit 202 of the information processing apparatus 2 that has received the photographic image from the image pickup apparatus 1 may store the photographic image in a storage medium or a server outside of the image pickup apparatus 1, such as the information storage unit 205 of the information processing apparatus 2, according to the operation state based on the restriction signal or the release signal.

Figure 12:
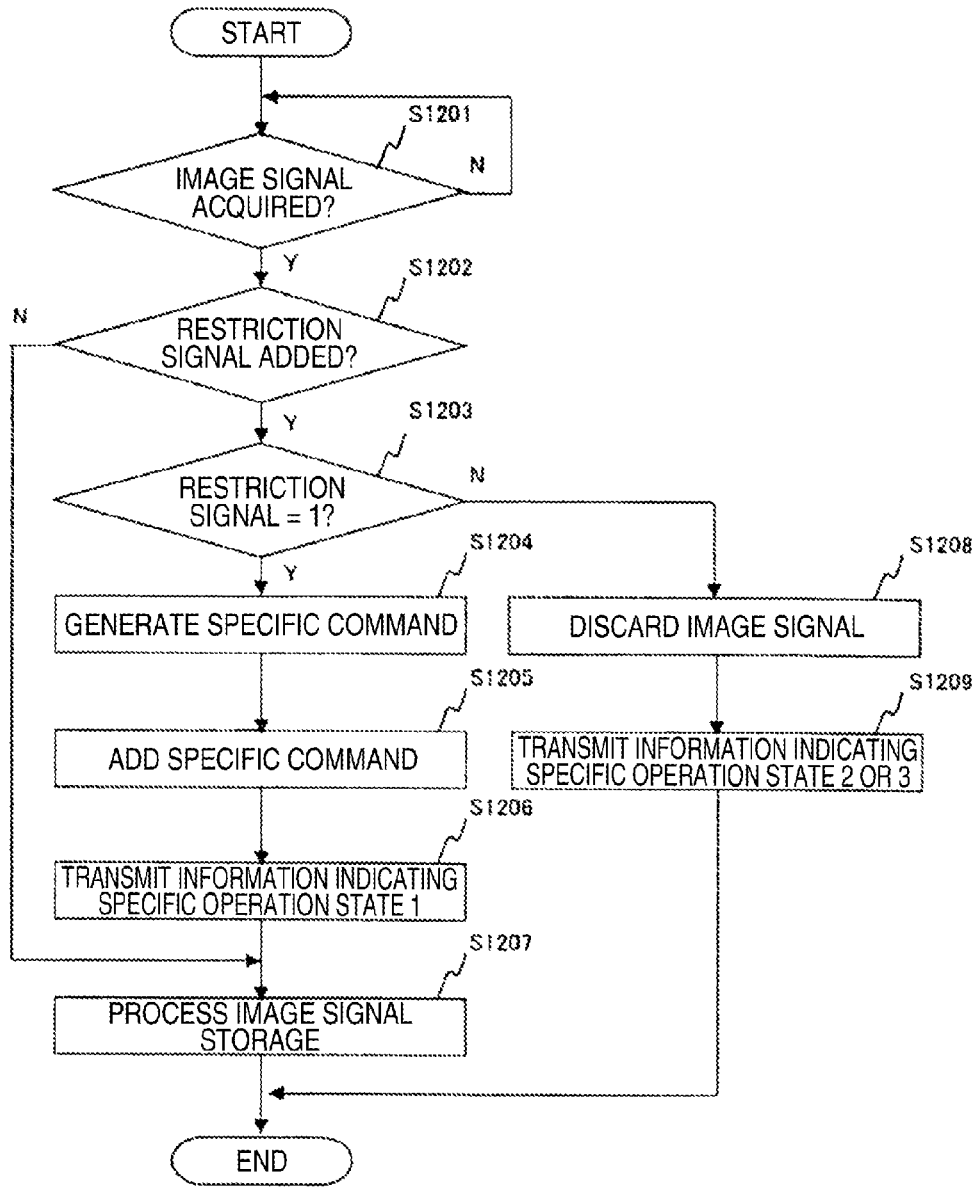
FIG. 12 is a flow chart illustrating operation of configuration units of the information processing apparatus when a photographic image picked up and generated by the image pickup apparatus is stored in an information storage unit of the information processing apparatus according to the embodiment of the present invention.

FIG. 12 is a flow chart illustrating operation of the configurations units of the information processing apparatus 2 when the photographic image acquired by the image pickup apparatus 1 is stored in the information storage unit 205 of the information processing apparatus 2. As shown in FIG. 12, the communication processing unit 201 waits (S1201/NO) until the communication processing unit 201 acquires the photographic image from the image pickup apparatus 1 through the communication input-output unit 204 (S1201/YES).

If the communication processing unit 201 acquires the photographic image (S1201/YES), the control unit 203 determines whether the restriction signal is added to the acquired photographic image (S1202). Note that the restriction signal is a restriction signal acquired from the audio processing unit 102 or the like of the image pickup apparatus 1. When the audio processing unit 102 or the like acquires the restriction signal, the photographic image provided with the acquired restriction signal is transmitted to the information processing apparatus 2.

If the control unit 203 determines that the restriction signal is added (S1202/YES), the control unit 203 determines whether the added restriction signal is "1" (S1203). If the restriction signal is "1" (S1203/YES), the control unit 203 shifts the operation state to the "specific operation state 1" shown in FIG. 4 and controls the image processing unit 202 to generate a specific command (S1204). The control unit 203 adds the specific command to the acquired photographic image (S1205) and provides the restriction state for storing the photographic image in the information storage unit 205.

The control unit 203 notifies the communication processing unit 201 to transmit the information for displaying the fact that the added restriction signal indicates the "specific operation state 1" to the image pickup apparatus 1 (S1206). As a result, the display unit of the image pickup apparatus 1 displays an operation state display image indicating the "specific operation state 1".

Although the image processing unit 108 of the image pickup apparatus 1 generates the operation state display image based on the information transmitted from the communication processing unit 201 in the example of the present embodiment, the image processing unit 202 of the information processing apparatus 2 may generate and transmit the operation state display image to the image pickup apparatus 1. If the operation state can be specified when the image pickup apparatus 1 acquires the restriction signal, the information processing apparatus 2 may not transmit the information for displaying the operation state to the image pickup apparatus 1.

The image processing unit 202 controlled in the "specific operation state 1" by the control unit 101 stores the photographic image provided with the specific command in the information storage unit 205 (S1207). Therefore, the information storage unit 205 plays a role similar to the image storage unit 111 in this case. Note that there is no restriction on the sequence of the process of S1206 and the process of S1207. The process of S1206 and the process of S1207 may be executed in the reversed order or may be executed in parallel.

On the other hand, if the restriction signal added to the photographic image is not "1" (S1203/NO), the acquired photographic image is discarded (S1208). This is because if the restriction signal is not "1", the specific operation state is the "specific operation state 2" or the "specific operation state 3" shown in FIG. 4, and the storage of the acquired photographic image in the information storage unit 205 is prohibited.

The control unit 203 notifies the communication processing unit 201 to transmit the information for displaying the fact that the added restriction signal indicates the "specific operation state 2" or the "specific operation state 3" to the image pickup apparatus 1 (S1209). As a result, the display unit of the image pickup apparatus 1 displays an operation state display image indicating the "specific operation state 2" or the "specific operation state 3". Note that there is no restriction on the sequence of the process of S1208 and the process of S1209. The process of S1208 and the process of S1209 may be executed in the reversed order or may be executed in parallel.

On the other hand, if the control unit 203 determines that the restriction signal is not added (S1202/NO), the operation state is the "normal operation state" shown in FIG. 4. Therefore, the image processing unit 202 directly stores the acquired photographic image in the information storage unit 205 (S1207).

According to the configuration, the convenience of the image pickup apparatus can also be enhanced while protecting the content in the environment of viewing the content. Furthermore, the photographic image is not stored in the image storage unit 111 included in the image pickup apparatus 1, and the amount of use of the storage medium of the image pickup apparatus 1 can be reduced. The image pickup apparatus 1 may not include the storage medium for storing the photographic image, and the weight of the image pickup apparatus 1 can be reduced.

Second Example

Next, a second example will be described. In the case described in the first example, the photographic image picked up and generated by the image pickup unit 109 is an image picked up and generated by a general camera, that is, an image in which what is picked up can be recognized. The image pickup apparatus 1 according to the second example includes the image pickup unit 109 that generates a photographic image in which what is picked up cannot be recognized.

More specifically, the image pickup unit 109 uses a WFC (Wave-front Coding) technology or the like to intentionally generate a photographic image that cannot be recognized. The WFC technology is a technology in which a phase plate is inserted to the image pickup unit 109 in order to expand the depth of focus, and the own taken image cannot be recognized. However, appropriate image processing can be applied to the obtained image to convert the image to an image that can be recognized.

The image pickup apparatus 1 according to the second example includes the image pickup unit 109 that generates an image that cannot be recognized as an image unless appropriate image processing is applied. In other words, it can be stated that the own image pickup unit 109 includes encryption means. FIG. 13(*a*) is a diagram illustrating a photographic image picked up and generated by the image pickup unit 109 in the present embodiment, and FIG. 13(*b*) is a diagram illustrating a restored image in which the photographic image of FIG. 13(*a*) is restored. In this way, the user cannot recognize the restored image of FIG. 13(*b*) from the photographic image shown in FIG. 13(*a*).

Hereinafter, a configuration of processing the photographic image as shown in FIG. 13(*a*) encrypted by the image pickup unit 109 in this way will be described as the second example. In the second example, the image pickup apparatus 1 transmits the photographic image encrypted by the image pickup unit 109 to the information processing apparatus 2 through the network, and the information processing apparatus 2 restores the encrypted photographic image. The photographic image restored according to the operation state based on the restriction signal and the release signal is stored in the information storage unit 205.

Figure 14:
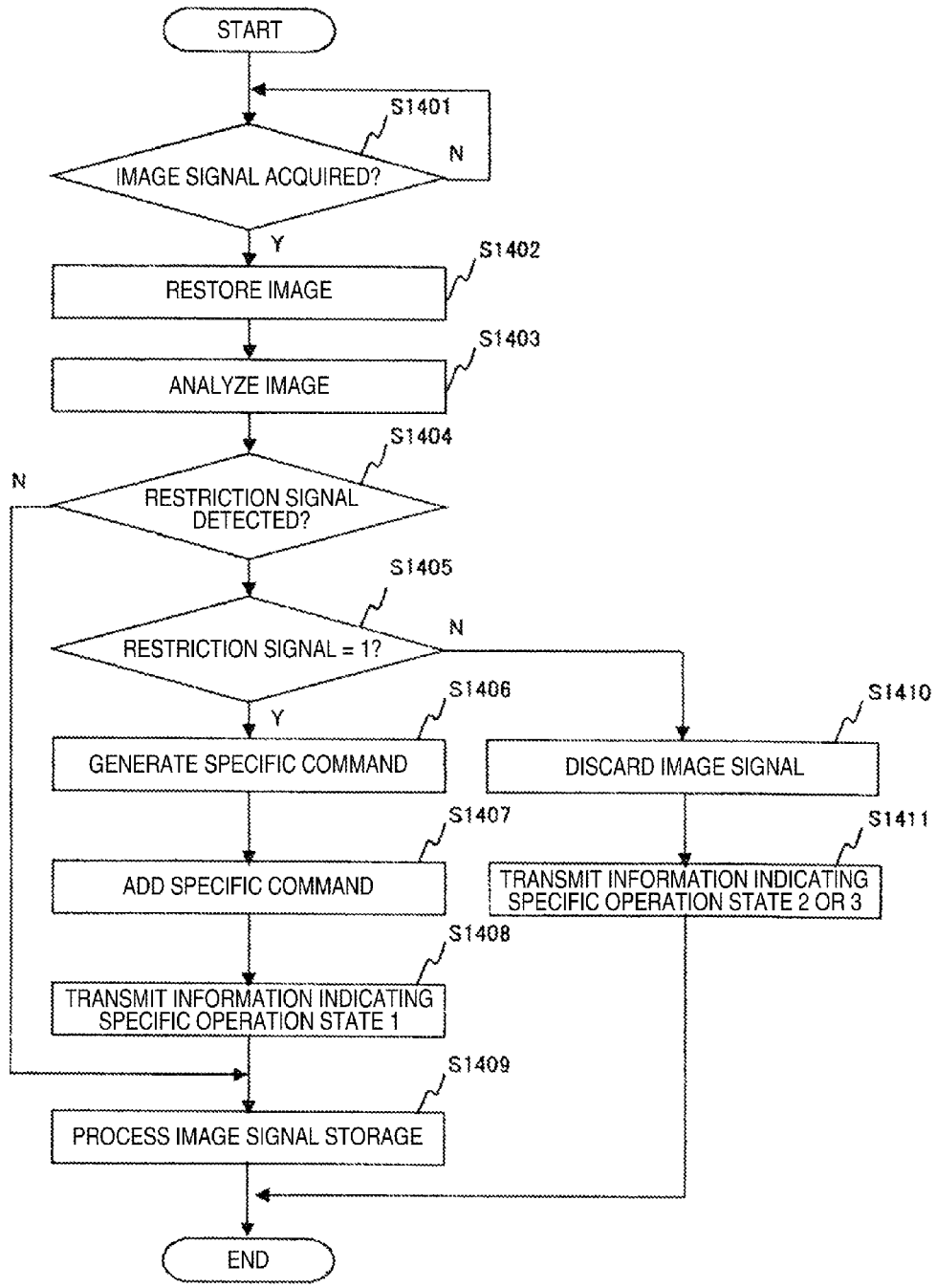
FIG. 14 is a flow chart illustrating operation of configuration units of the information processing apparatus according to a second example of the embodiment of the present invention.

FIG. 14 is a flow chart illustrating operation of the configuration units of the information processing apparatus 2 in the second example. As shown in FIG. 14, the communication processing unit 201 waits (S1401/NO) until the communication processing unit 201 acquires a photographic image from the image pickup apparatus 1 through the communication input-output unit 204 (S1401/YES). Note that the photographic image acquired by the communication processing unit 201 in the present embodiment is a photographic image as shown in FIG. 13(*a*) encrypted by the image pickup unit 109.

If the communication processing unit 201 acquires a photographic image (S1401/YES), the image processing unit 202 restores the acquired photographic image according to a request from the image pickup apparatus 1 (S1402). The request from the image pickup apparatus 1 includes information for restoring the taken image, and when the WFC technology is used for example, the information for the restoration is focal position information or the like of the restored image. The request from the image pickup apparatus 1 may be information indicating the encryption means used in the image pickup unit 109.

The image processing unit 202 that has restored the photographic image analyzes the restored photographic image (S1403). Specifically, the image processing unit 202 detects a specific image object from the photographic image as in the first example. If the image processing unit 202 detects a specific image object from the photographic image, the image processing unit 202 detects and acquires the specific image object as a restriction signal.

If the restriction signal is detected (S1404/YES), the control unit 203 hereafter executes a process similar to the process of S1203 to S1209 shown in FIG. 12 (S1405 to S1411). On the other hand, if the restriction signal is not detected (S1404/NO), the control unit 203 executes a process similar to the process of S1207 shown in FIG. 12 (S1409).

According to the configuration, the photographic image encrypted by the image pickup unit 109 needs to be transmitted to and restored by the information processing apparatus 2 connected to the image pickup apparatus 1 through the network. Therefore, even if there is a plurality of image pickup apparatuses 1, the photographic image generated by each image pickup apparatus 1 is transmitted to the information processing apparatus 2 connected through the network, and the information processing apparatus 2 can comprehensively manage the photographic images.

Note that a plurality of encrypted photographic images may be acquired and the plurality of acquired photographic images may be analyzed in the present embodiment. For example, when the WFC technology is used, the acquired photographic images with various focal positions can be restored to detect a specific image object that cannot be detected from one photographic image, and the detection accuracy of the specific image object is enhanced.

In the example described in the present embodiment, the information processing apparatus 2 executes the image restoration process, the image analysis process, and the image storage process. However, this is just an example, and a specific information processing apparatus different from the information processing apparatus 2 may execute the image restoration process and the image analysis process.

Figure 15:
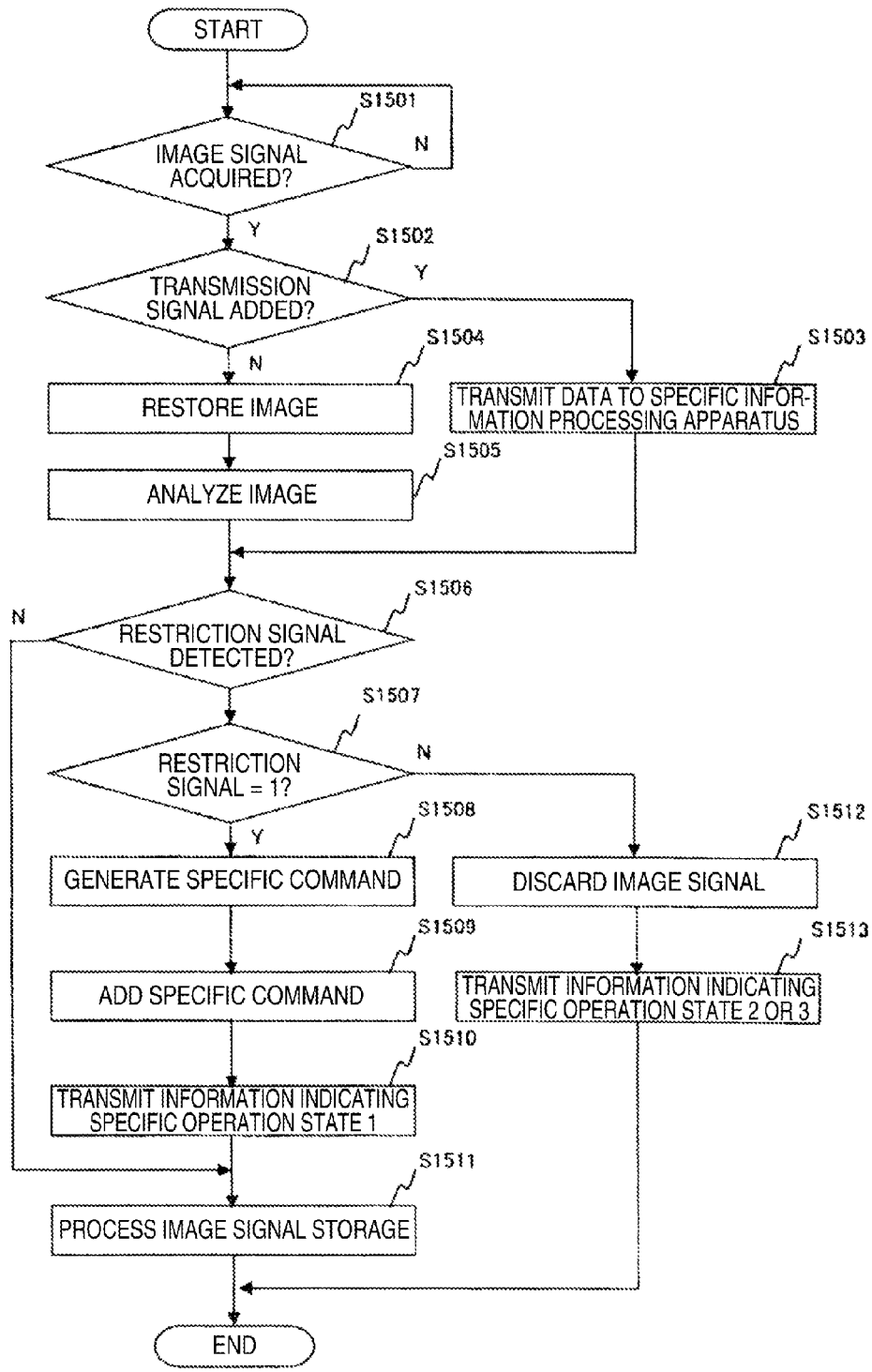
FIG. 15 is a flow chart illustrating operation of the information processing apparatus when a specific information processing apparatus different from the information processing apparatus that executes an image restoration process and an image analysis process is connected through a network according to the second example of the embodiment of the present invention.

FIG. 15 is a flow chart illustrating operation of the information processing apparatus 2 when a specific information processing apparatus different from the information processing apparatus 2 that executes the image restoration process and the image analysis process is connected through the network. As shown in FIG. 15, the communication processing unit 201 waits (S1501/NO) until the communication processing unit 201 acquires a photographic image from the image pickup apparatus 1 through the communication input-output unit 204 (S1501/YES). Note that the photographic image acquired by the communication processing unit 201 in the present embodiment is a photographic image as shown in FIG. 13(*a*) encrypted by the image pickup unit 109.

If the communication processing unit 201 acquires a photographic image (S1501/YES), the control unit 203 determines whether transmission instruction information indicating transmission to the specific information processing apparatus is added to the acquired photographic image (S1502). The transmission instruction information is, for example, a specific transmission signal of position information indicating the position of the image pickup apparatus 1 that has transmitted the acquired photographic image, a transmission command, and the like.

One of the image pickup apparatus 1, the base station 5-1, and the access point 3 adds the transmission instruction information to the photographic image picked up and generated in a predetermined specific space (location), for example. Alternatively, the restriction signal or the release signal acquired by the audio processing unit 102 or the like described in the first example may be the specific transmission signal.

If the control unit 203 determines that the transmission instruction information is added (S1502/YES), the communication processing unit 201 transmits the photographic image to the specific information processing apparatus through the communication input-output unit 204 (S1503). As a result, the specific information processing apparatus applies the image restoration process and the image analysis process to the photographic image transmitted from the information processing apparatus 2 and transmits the analyzed photographic image to the information processing apparatus 2. Hereafter, the control unit 203 executes a process similar to the process of S1404 to S1411 shown in FIG. 14 (S1506 to S1514).

On the other hand, if the control unit 203 determines that the transmission instruction information is not added (S1502/NO), the configuration units of the information processing apparatus 2 hereafter executes a process similar to S1402 to S1411 shown in FIG. 14 (S1504 to S1513).

According to the configuration, the photographic image picked up and generated in the specific space (location) is transmitted to the specific information processing apparatus connected to the image pickup apparatus 1 and the information processing apparatus 2 through the network, and the image is restored and analyzed. Therefore, the photographic images picked up and generated in the specific space can be comprehensively managed.

Third Example

Next, a third example will be described. In the first and second examples, the control unit 101 acquires the restriction signal and the release signal based on the information generated outside of the image pickup apparatus 1, such as the photographic image, the audio information, the wireless signal, and the position information. In the third example, the control unit 101 acquires the restriction signal and the release signal from information generated by the image pickup apparatus 1 alone.

Figure 16:
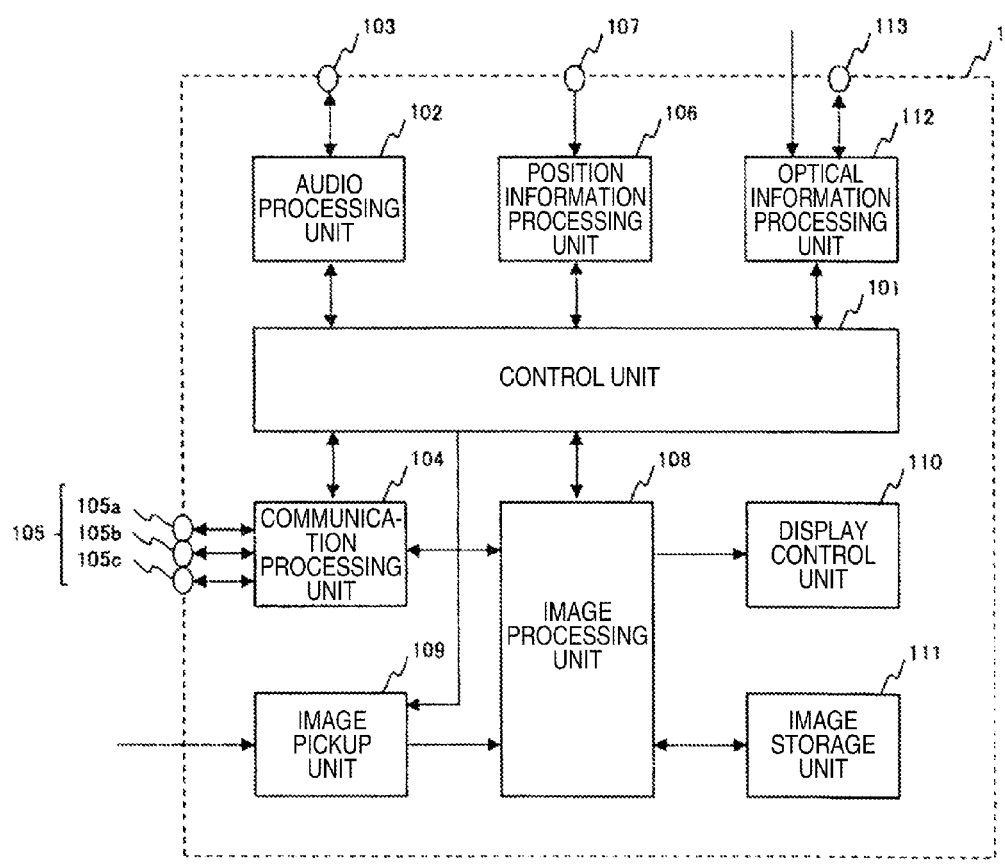
FIG. 16 is a block diagram illustrating a functional configuration of the image pickup apparatus according to a third example of the embodiment of the present invention.

FIG. 16 is a block diagram illustrating a functional configuration of the image pickup apparatus 1 according to the third example. As shown in FIG. 16, the image pickup apparatus 1 according to the third example includes an optical information processing unit 112 and an optical information input-output unit 113 in addition to the configuration units of the image pickup apparatus 1 according to the first example shown in FIG. 3. Hereinafter, only the components different from the configuration units shown in FIG. 3 will be described and the other configurations will not be described. The optical information input-output unit 113 includes: a light emitting unit that is a light emitting element such as an LED (Light Emitting Diode); and a light receiving unit that is a light receiving element such as a PD (Photo Diode).

Figure 17:
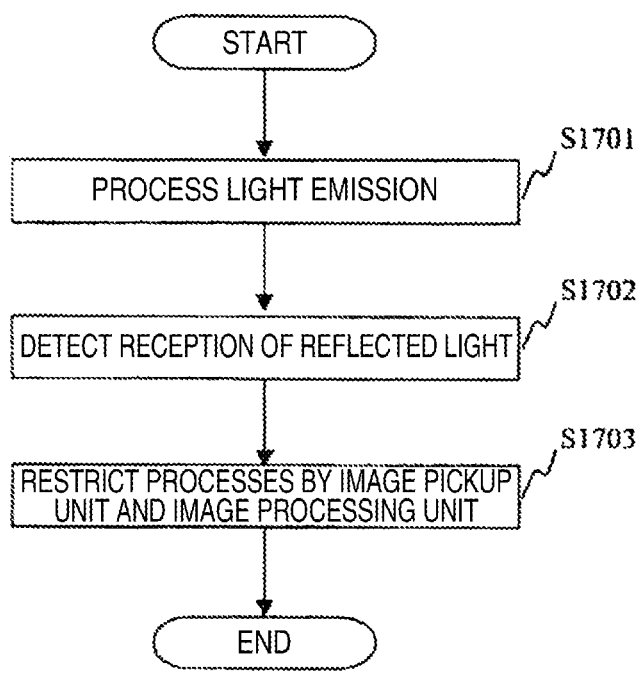
FIG. 17 is a flow chart illustrating operation of an optical information processing unit and the control unit according to the third example of the embodiment of the present invention.

FIG. 17 is a flow chart illustrating operation of the optical information processing unit 112 and the control unit 101. As shown in FIG. 17, the optical information processing unit 112 receives a light emitting command from the control unit 101 and executes a light emitting process of turning on the light emitting element of the optical information input-output unit 113 (S1701). In the present embodiment, when the image pickup process by the image pickup unit 109 is started, the light emitting element, such as a red LED with visible light and an infrared LED with infrared light, near the image pickup unit 109 emits light as a result of the process of S1701. Therefore, the light emitting element plays a role of an indicator indicating that the image is being picked up. In this way, the fact that the image pickup apparatus 1 is picking up an image can be easily viewed from the outside or can be easily recognized by an apparatus or the like for detecting the infrared light.

When the light from the light emitting element of the optical information input-output unit 113 is bounced off an object, and the optical information processing unit 112 that has executed the light emitting process detects that the light receiving element of the optical information input-output unit 113 has received reflected light (S1702), the optical information processing unit 112 notifies the control unit 101 of the detection. For example, when the user uses the image pickup apparatus 1 to start the image pickup process in a movie theater, a museum, or the like in which photographing is prohibited, the light emitting element near the image pickup unit 109 emits light, and the fact that the image is being taken can be easily recognized from the outside. Therefore, the user tries to hide the light from the light emitting element by hand or the like in order to secretly pick up an image. In such a case, the hand becomes a reflection object, and the light from the light emitting element is bounced off. The reception of the reflected light by the light receiving element is detected.

The control unit 101 that has received the notification from the optical information processing unit 112 performs control of restricting the processes by the image pickup unit 109 and the image processing unit 108 (S1703). Specifically, for example, the control unit 101 performs control of terminating the transmission of the image pickup command signal to the image pickup unit 109 and disabling the image pickup process by the image pickup unit 109 (that is, providing the "specific operation state 3" shown in FIG. 4). Alternatively, for example, the control unit 101 may control the image pickup unit 109 and the image processing unit 108 to provide the operation state of one of the "specific operation state 1" and the "specific operation state 2" shown in FIG. 4.

When the normal operation state is shifted to the specific operation state, the control unit 101 may notify the image processing unit 108 to generate the operation state display image for displaying one of the specific operation states as in the process of S508 shown in FIG. 5.

In this way, the detection of the reception of the reflected light of the light from the light emitting element denotes acquisition of the restriction signal. Therefore, the control unit 101 according to the third example acquires the restriction signal from the information generated by the image pickup apparatus 1 alone.

When the light receiving element does not receive the reflected light any more, the control unit 101 may release the restriction state of the image pickup unit 109 and the image processing unit 108. In this case, the fact that the light receiving element does not receive the reflected light any more denotes the acquisition of the release signal. Therefore, the control unit 101 according to the third example acquires the release signal from the information generated by the image pickup apparatus 1 alone.

By providing the light emitting element, the fact that the image is being picked up can be recognized from the outside with a simple configuration. According to the configuration, when the user deliberately hides the light emitting element for the purpose of secret photographing, the image pickup process and the storage process of the photographic image can be restricted, and the secret photographing of the content can be prevented.

In the example described in the present embodiment, the control unit 101 performs the control of restricting the operation of the image pickup unit 109 and the image processing unit 108 when the light receiving element detects the reflected light. In addition, when the light receiving element detects the reflected light, the optical information processing unit 112 first measures the time from the light emission by the light emitting element to the light reception of the reflected light. The optical information processing unit 112 calculates the distance from the light emitting element to the reflected object according to the measured time and outputs the calculated distance to the control unit 101.

When the distance output from the optical information processing unit 112 is equal to or smaller than a predetermined distance (for example, 30 cm), the control unit 101 performs the control of restricting the processes by the image pickup unit 109 and the image processing unit 108. Note that the time measured by the optical information processing unit 112 may be output to the control unit 101, and the control unit 101 may calculate the distance from the light emitting element to the reflection object based on the output time.

This is because when the distance from the light emitting element to the reflection object is relatively close, the reflection object can be an object, such as a hand, for deliberately hiding the light emitting element. On the other hand, when the distance from the light emitting element to the reflection object is relatively far, the reflection object may not be an object for deliberately hiding the light emitting element, and the light may be reflected by chance by a reflection object such as a wall. According to the configuration, the secret photographing of the content can be more accurately prevented.

The present invention is not limited to the examples, and the present invention includes various modifications. For example, the embodiments are described in detail to facilitate the understanding of the present invention, and the present invention is not necessarily limited to the embodiments including all of the described configurations. Part of a configuration of an embodiment can be replaced by a configuration of another embodiment, and a configuration of an embodiment can be added to a configuration of another embodiment. Another configuration can also be added, deleted, and substituted for part of the configuration of each embodiment.

Part or all of the configurations, the functions, the processing units, the processing means, and the like may be designed by, for example, integrated circuits to realize them by hardware. A processor may interpret and execute programs for realizing the functions to realize the configurations, the functions, and the like by software. Information, such as programs, tables, and files, for realizing the functions can be placed in a recording device, such as a memory, a hard disk, and an SSD (Solid State Drive), or in a recording medium, such as an IC card, an SD card, and a DVD.

Control lines and information lines considered necessary for the description are illustrated, and all control lines and information lines in a product are not necessarily illustrated. It can be considered that in reality, almost all of the components are connected to each other.

REFERENCE SIGNS LIST 1 image pickup apparatus
2 information processing apparatus
3 access point
4 network
5-1, 5-2, 5-3 base station
101 control unit
102 audio processing unit
103 audio input-output unit
104 communication processing unit
105 communication input-output unit
106 position information processing unit
107 position information input unit
108 image processing unit
109 image pickup unit
110 display control unit
111 image storage unit
112 optical information processing unit
113 optical information input-output unit
201 communication processing unit
202 image processing unit
203 control unit
204 communication input-output unit
205 information storage unit

The invention claimed is:

1. An image pickup apparatus comprising:
a camera configured to perform processing for image acquisition to acquire image information via photoelectric conversion;
an image processor configured to generate a first image file based on the image information acquired by the camera and to store the first image file in a storage medium;
a display configured to display an image based on the image information acquired by the camera or an image based on the first image file stored in the storage medium; and
a controller configured to acquire restriction information and to control the camera and the image processor based on the acquired restriction information, and
wherein the controller is further configured to cause the camera and the image processor to transition to:
when the acquired restriction information is a first type, a first specific operation state in which acquisition of image information by the camera is possible and storage of the first image file in the storage medium by the image processor is restricted, and
when the acquired restriction information is a second type, a second specific operation state in which acquisition of image information by the camera is restricted and storage of the first image file in the storage medium by the image processor is restricted.

2. The image pickup apparatus according to claim 1, wherein a state in which storage of the first image file in the storage medium is restricted is a state in which a second image file with addition of information indicating restriction of processing of the first image file can be stored in the storage medium.

3. The image pickup apparatus according to claim 1, wherein a state in which storage of the first image file in the storage medium is restricted is a state in which storage of the first image file in the storage medium is prohibited.

4. The image pickup apparatus according to claim 1, wherein the controller is further configured to acquire the restriction information based on input information input according to a location of acquisition of the image information.

5. The image pickup apparatus according to claim 4, wherein the input information is audio information.

6. The image pickup apparatus according to claim 4, wherein the input information is the image information acquired by the camera.

7. The image pickup apparatus according to claim 4, further comprising:
communication circuitry configured to receive the input information transmitted wirelessly from outside, wherein the input information is information received by the communication circuitry.

8. The image pickup apparatus according to claim 4, wherein the input information is position information of the image pickup apparatus.

9. The image pickup apparatus according to claim 1, further comprising:
a light emitting unit configured to emit light during acquisition of the image information; and
a light receiving unit configured to receive light,
wherein the controller is configured to cause the transition to the first specific operation state when the light receiving unit receives reflected light of the light from the light emitting unit.

10. The image pickup apparatus according to claim 1, further comprising:
a display controller configured to cause the display to display images indicating states of respective restrictions of acquisition of the image information and storage of the first image file.

11. An image pickup apparatus comprising:
a camera configured to perform processing for image acquisition to acquire image information via photoelectric conversion;
an image processor configured to generate a first image file based on the image information acquired by the camera and to store the first image file in a storage medium;
a display configured to display an image based on the image information acquired by the camera or an image based on the first image file stored in the storage medium; and
a controller configured to acquire restriction information and to control the camera and the image processor based on the acquired restriction information,
wherein the controller is further configured to cause the camera and the image processor to transition to:
when the acquired restriction information is a first type, a first specific operation state in which acquisition of image information by the camera is possible and the image processor adds a specific command to the first image file and stores the first image file with the specific command added in the storage medium,
when the acquired restriction information is a second type, a second specific operation state in which acquisition of image information by the camera is possible and storage of the first image file in the storage medium by the image processor is prohibited, and
when the acquired restriction information is a third type, a third specific operation state in which acquisition of image information by the camera is prohibited and storage of the first image file in the storage medium by the image processor is prohibited.

12. The image pickup apparatus according to claim 11, wherein the specific command is a command to cause the stored first image file to be limited for personal use.

13. The image pickup apparatus according to claim 11, wherein the specific command comprises one of a command for prohibiting transmission of the first image file stored to another apparatus, a command for allowing only a user of the image pickup apparatus to browse the first image file stored, a command requesting personal authentication to browse the first image file stored, or a command for blocking disclosure of the first file stored on the Internet.

14. The image pickup apparatus according to claim 11, further comprising:
a display controller configured to cause the display to display an icon indicating which one of the first specific operation state, the second specific operation state, or the third specific operation state the image pickup apparatus is in.

15. A method for restricting functionality of an image pickup apparatus, comprising the steps of:
acquiring image information via photoelectric conversion with a camera;
generating a first image file with an image processor based on the image information acquired by the camera and storing the first image file in a storage medium;
displaying an image based on the image information acquired by the camera or an image based on the first image file stored in the storage medium;
acquiring restriction information; and
controlling the camera and the image processor with a controller based on the acquired restriction information,
wherein the controlling causes the camera and the image processor to transition to:
when the acquired restriction information is a first type, a first specific operation state in which acquisition of image information by the camera is possible and storage of the first image file in the storage medium by the image processor is restricted, and
when the acquired restriction information is a second type, a second specific operation state in which acquisition of image information by the camera is restricted and storage of the first image file in the storage medium by the image processor is restricted.

* * * * *